No. 623,557. Patented Apr. 25, 1899.
J. McA. PALMER.
WAVE MOTOR.
(Application filed Apr. 16, 1898.)
(No Model.)
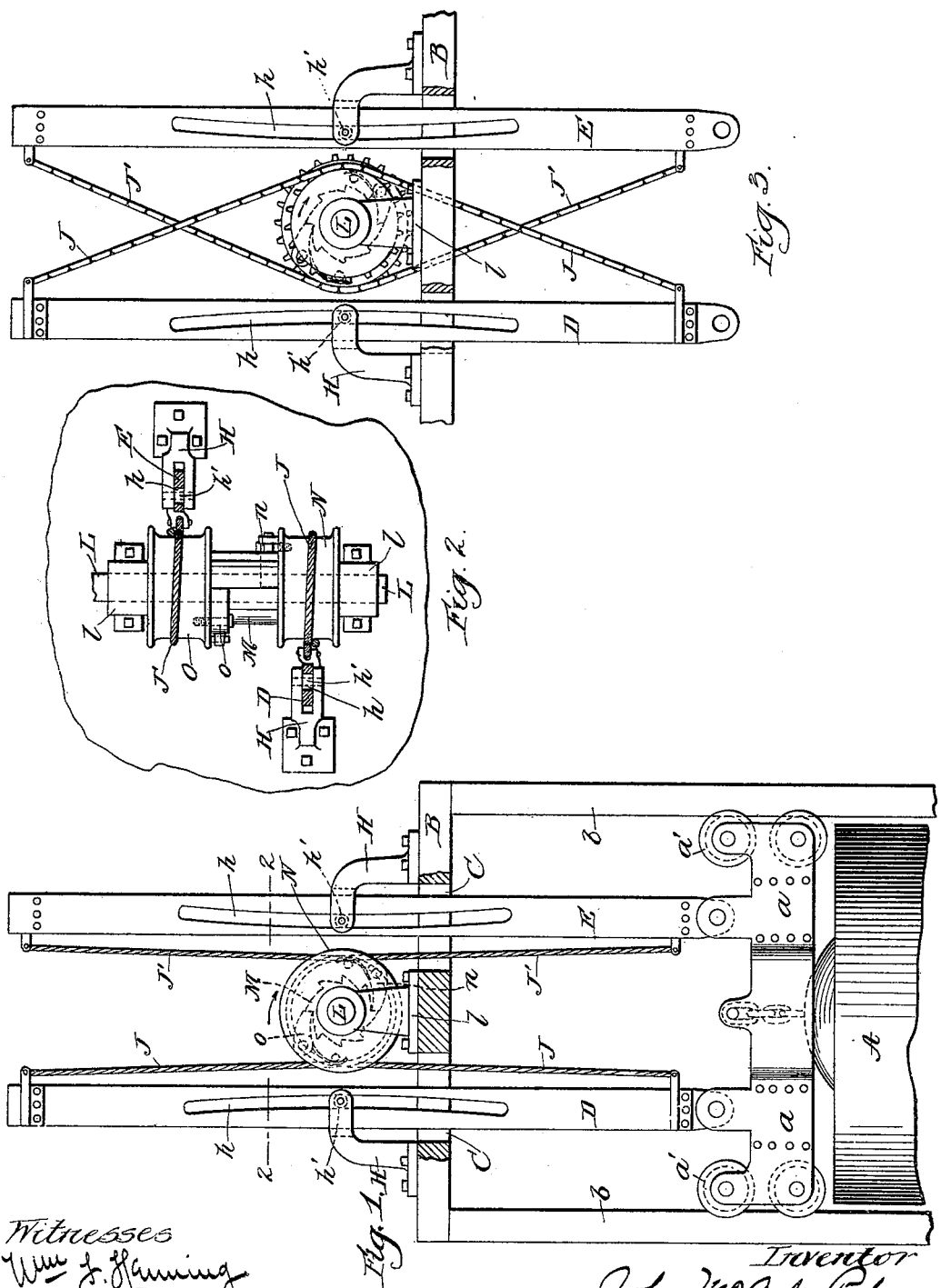

UNITED STATES PATENT OFFICE.

JOHN McAULEY PALMER, OF CHICAGO, ILLINOIS.

WAVE-MOTOR.

SPECIFICATION forming part of Letters Patent No. 623,557, dated April 25, 1899.

Application filed April 16, 1898. Serial No. 677,886. (No model.)

*To all whom it may concern:*

Be it known that I, JOHN MCAULEY PALMER, a citizen of the United States, residing at Chicago, in the county of Cook and State of Illinois, have invented certain new and useful Improvements in Wave-Motors, of which the following is a specification.

My invention relates to certain new and useful improvements in wave-motors, and has particular reference to that class in which the action is direct, an example of which is illustrated in my Patent No. 607,072, dated July 12, 1898.

The primary object of this invention is to provide a simple and effective apparatus for utilizing the power of waves and one which can be constructed inexpensively and easily mounted in position for service.

Another important object of the invention is to provide an apparatus of this character which shall be entirely automatic in its operation and not require constant care and attention; and a further object of the invention is to recover the maximum degree of power from the impulses of waves in ascending and descending by means of an apparatus constructed and mounted in such a manner as to provide for all shocks and jerks due to unevenness and irregularity in the impulses of the waves.

My invention has other objects in view of equal importance with those above referred to and which will be pointed out and explained hereinafter in the general description of the invention in connection with the accompanying drawings, in which—

Figure 1 is a side view, partly in section, of an apparatus, showing a simple and convenient embodiment of the invention. Fig. 2 is a transverse sectional view on the line 2 2 of Fig. 1. Fig. 3 illustrates the invention embodying sprockets and chains as equivalents for the drums and ropes.

Referring to the drawings, in which like letters of reference denote corresponding parts in all the figures, A designates a float, of some approved construction, which is actuated by the wave impulses and guided in its movements in a suitable manner. The float is preferably connected loosely with a cross-piece $a$ by means of a chain or other device, the cross-piece being provided with guide-rollers $a'$, which operate on the piles $b$ or on ways or tracks secured to the piles. This cross-piece is of a novel construction, preferably, which I have described and claimed fully in another application filed by me concurrently herewith. A platform B is suitably supported above the float, it being understood, of course, that the emplacement of an apparatus of this character will necessarily vary greatly under the different conditions which exist where it will be useful, and for this reason I have not deemed it essential to enter into the details of the framework and other like parts. Driving-rods D E are connected to the cross-piece, as indicated, and they extend upward through openings C, provided for them in the platform, these openings being of sufficient size to permit the free movement of the rods.

A power-shaft L is mounted in bearings in the supporting-brackets $l$, arranged on the platform between the driving-rods, and a ratchet-wheel M is secured on the shaft or is formed integrally therewith. Drums N O are loosely mounted on the power-shaft at opposite ends of the ratchet-wheel, and pawls $n$ $o$ are connected to the drums and are arranged to operate in contact with the ratchet-wheel, so that the power-shaft shall turn in one direction only. It is obvious that a connection may be effected between the drums and the power-shaft in many different ways, and I have illustrated one very simple arrangement, but would have it understood that I do not intend to limit myself thereto, but desire to employ any means for accomplishing this connection.

A rope J is connected to the driving-rod D at its top and bottom and trained around the drum N, and a corresponding rope J' is connected to the driving-rod E and is trained around its drum O. Instead of using ropes and drums, as illustrated in Fig. 1, I may use their equivalents, such as sprocket-wheels and sprocket-chains, as shown in Fig. 3, this particular arrangement being generally recognized as an equivalent for the ropes and drums in this and many other arts. To avoid alternative expressions, I will refer in the description and claims to the "drums" and "ropes," but intend thereby that it should be understood that these terms include and cover the sprocket and chains and all other equivalent constructions.

In order to keep the tension on the driving ropes or chains constant as the float rises and falls, I provide means for imparting a lateral movement to the upper portions of the driving-rods, while the lower ends of the driving-rods and the cross-piece and float travel in vertical planes which are unvarying in so far as any effect on the operation of the apparatus is concerned. Of course the parts may become loose, and to that extent the vertical planes of travel of the lower ends of the rods may vary more or less; but as compared with the upper portions of the rods they maintain the same substantial direction of travel, and this is what I mean by "unvarying" as used here and in other connections.

In my Patent No. 607,072, before referred to, I have described a guide-frame provided with grooves in which the upper ends of the rods are guided; but the same result may be accomplished by forming grooves $h$ in the sides of the rods to receive guide-studs $h'$, mounted on the brackets H. When the float impels the driving-rods upward, the upper portions of the rods will move laterally by reason of the fixed guide-studs traveling in the curved grooves, so as to keep the tension on the ropes or chains constant.

The operation of the apparatus is as follows: When the float receives the upward impulse of a wave, the driving-rods will rise and the rope or chain J will communicate the movement of the float to the power-shaft, because the upward movement of the driving-rod draws this rope around the drum and the drum is revolved, the pawl $n$ engaging the ratchet M and rotating the shaft. The rope preferably makes at least one complete turn around the drum, so as to secure the necessary frictional contact with the drum to revolve the same; but when the chain and sprocket are employed an engagement of the chain with a few teeth of the sprocket will be sufficient. As the rope J is revolving its drum and rotating the shaft the rope J' is revolving its drum also; but this drum O turns freely on the shaft at this time, because the pawl $o$ is running freely backward over the ratchet-teeth. However, when the float begins to descend the rope J' becomes operative and revolves the drum O, and the pawl $o$ engages the ratchet-teeth and turns the shaft while the drum N is revolving freely. I thus provide for a continuous operation of the power-shaft during the upward and downward movements of the float under the influence of the wave impulses, and this obtains under all conditions and entirely regardless of the character or regularity of the waves. The movement communicated to the power-shaft is regular and as constant as the wave impulses provide, and this power-shaft may actuate machinery direct or be employed indirectly for this purpose. The lateral movement of the driving-rods serves to maintain the ropes or chains taut at all times and at a steady and even tension. The grooves are located, preferably, at the middle of the rods; but they may be differently arranged.

In my concurrent application I have described and claimed other means for accomplishing the same result which embody weights and in some instances employing but one driving-rod. It is obvious that the wave-power could be communicated to the power-shaft in the present construction if only one driving-rod were employed; but the movement of the power-shaft in that case would be intermittent.

Changes and alterations in the construction and arrangements of parts may be made by those skilled in the art without departing from the invention, and I would therefore have it understood that I reserve the right to make any and all changes that fall within the spirit and scope of the invention.

In Fig. 3 the sprocket-wheels are shown of different sizes for clearness of illustration, and I do not limit myself to this construction.

Having thus fully described my invention, what I claim, and desire to secure by Letters Patent, is—

1. The combination with a power-shaft, of a pair of driving-rods located on opposite sides of the power-shaft, said rods being provided with curved guide-grooves, means for actuating the rods, devices operating in the grooves to guide the rods and impart thereto a lateral movement in opposite directions coincident with their vertical movement, and connections between the rods and power-shaft, substantially as described.

2. The combination with a power-shaft, of a pair of driving-rods located on opposite sides of the power-shaft, said rods being provided with curved guide-grooves, means for actuating the rods, devices operating in the grooves to guide the rods and impart thereto a lateral movement in opposite directions coincident with their vertical movement, drums loosely mounted on the driving-shaft, ropes connected to the ends of the driving-rods and engaging the drums, and means for locking the drums to the power-shaft, substantially as described.

3. The combination with a power-shaft and a float, of driving-rods connected with the float and adapted to be actuated thereby, means for imparting a lateral movement to the rods coincident with their vertical movement, drums loosely mounted on the power-shaft, a pair of ropes or chains, the ends of said ropes or chains being permanently secured to the ends of the rods and trained around the respective drums, and means for locking the drums to the power-shaft alternately, whereby the power-shaft is rotated continuously in one direction during the up-and-down movement of the driving-rods, substantially as described.

4. The combination with a power-shaft and a float, of driving-rods provided with grooves and connected with the float and the power-shaft, and guide-studs operating in the grooves to guide the driving-rods laterally during their vertical movement, substantially as described.

5. The combination with a frame, a power-shaft and a float, of driving-rods connected with the power-shaft and the float and provided with grooves between their ends, and guide-studs mounted on the frame and opposite to the power-shaft and operating in said grooves to guide the driving-rods laterally during their vertical movement, substantially as described.

6. The combination with a frame, a power-shaft and a float, of driving-rods connected with the power-shaft and the float and provided with grooves, the groove in each rod having its ends directed outwardly, and guiding devices operating in the grooves to guide the driving-rods laterally during their vertical movement, substantially as described.

7. The combination with a power-shaft and a vertically-movable float, of a cross-piece loosely connected with the float, driving-rods provided with grooves and pivotally connected to the cross-piece at their lower ends, said driving-rods being arranged on opposite sides of the power-shaft, devices operating in said grooves to impart a lateral movement to the driving-rods coincident with their vertical movement, drums loosely mounted on the power-shaft, ropes connected to the driving-rods and engaging the drums to revolve the same and means for locking the drums alternately to the power-shaft, substantially as described.

8. The combination with a power-shaft and a vertically-movable float, of a cross-piece loosely connected with the float, driving-rods provided with grooves and pivotally connected to the cross-piece at their lower ends, said driving-rods being arranged on opposite sides of the power-shaft, devices operating in said grooves to impart a lateral movement to the driving-rods coincident with their vertical movement, a ratchet-wheel rigid with the power-shaft, drums loosely mounted on the power-shaft at each end of the ratchet-wheel, ropes connected to the ends of the driving-rods and trained around their respective drums in opposite directions and pawls carried on the drums and arranged to engage the ratchet-wheel to lock the drums alternately to the power-shaft, substantially as described.

JOHN McAULEY PALMER.

Witnesses:
WM. O. BELT,
C. L. WOOD.